United States Patent Office 3,655,680
Patented Apr. 11, 1972

3,655,680
METHOD FOR THE PRODUCTION OF THE (+)-OPTICAL ISOMER OF α-RACEMATE 2-(2-ETHYL-2-PHENYL-1,3-DIOXOLAN-4-YL)-PIPERIDINE
Robert E. Allen and Charles R. Thompson, Walnut Creek, and John Hidalgo, Oakland, Calif., assignors to Cutter Laboratories, Inc.
No Drawing. Filed Feb. 18, 1969, Ser. No. 800,282
Int. Cl. C07d 29/18
U.S. Cl. 260—293.67
3 Claims

ABSTRACT OF THE DISCLOSURE

The (+) optical isomer of the alpha racemate of 2-(2-ethyl-2-phenyl1,3-dioxolan-4-yl)-piperidine, is prepared by the acid catalyzed condensation of the (—) optical isomer of the alpha racemate of 2-piperidyl-1,2-ethanediol hydrochloride with propiophenone dipropyl acetal, and acts as a muscle relaxant and induces general anesthesia in primates when administered parenterally.

SUMMARY OF INVENTION

This invention relates to one of the optical isomers of 2-(2-ethyl-2-phenyl-1,3-dioxolan-4-yl)piperidine, to its use as an anesthetic and to a process for its production, more particularly to the (+) optical isomer of the alpha racemate of 2-(2-ethyl-2-phenyl-1,3-dioxolan-4-yl)piperidine, to its use as a parenteral general anesthetic, and to the production of it and other optical isomers of 2-substituted-4-[2-piperidyl]-dioxolanes from the alpha racemate of 2-(2,2-diphenyl-1,3-dioxolan-4-yl)-piperidine.

BACKGROUND OF INVENTION

U.S. Pat. 3,262,938, issued July 26, 1966, discloses a class of 2-substituted-4-(2-piperidyl)-dioxolanes, including in Example 12 the alpha-racemate of 2-ethyl-2-phenyl-4-(2-piperidyl)-1,3-dioxolane, which is the racemate of the optical isomer of this invention. It is disclosed to possess spasmolytic, anti-convulsant and central nervous system depressing activity. It is prepared by reacting the alpha racemate of 2-piperidyl-1,2-ethanediol hydrochloride with 1-phenyl-1,1-dipropoxypropane. Optical isomers of other dioxolanes are prepared, as disclosed in Examples 7-10 of that patent, by forming an acid addition salt of the corresponding racemate with an optically active acid and separating the optical isomers of the acid addition salt by fractional crystallization.

Because 2-(2-ethyl - 2 - phenyl-1,3-dioxolan-4-yl)-piperidine has three asymmetric carbon atoms, it can exist as four different racemic mixtures. Three of these are specifically disclosed in U.S. 3,262,938. The two racemates produced from the alpha-racemate of 2-piperidyl-1,2-ethanediol (the hydrochloride of which melts at 100–101°) are designated "alpha-racemate" (Example 12) and "gamma-racemate" (Example 13). Of the two racemates which were produced from the beta-racemate of 2-piperidyl-1,2-ethanediol (whose hydrochloride melts at 139–141°), the one which was isolated was designated the "beta-racemate." The compound of this invention is the dextrorotatory optical isomer of the alpha-racemate of 2-(2-ethyl-2-phenyl-1,3-dioxolan - 4 - yl)-piperidine. Nuclear magnetic rotation spectra have established the piperidine ring and the phenyl ring are trans with respect to the dioxolane ring.

DESCRIPTION OF INVENTION

The (+) optical isomer of the alpha-racemate of 2-(2-ethyl-2-phenyl-1,3-dioxolan - 4 - yl)-piperidine possesses useful and unexpected pharmacological activity, viz., general anesthetic, spasmolytic and anticonvulsant activity. Moreover, this optical isomer has four times the intravenous general anesthetic activity of its parent racemate, i.e., the compound of Example 12 of U.S. 3,262,938. This is totally unexpected because if one optical isomer of an active racemate is active and the other is inactive, the racemate ought possess half the activity of its active optical isomer. The fact the (+) optical isomer of this invention is four times as active as an I.V. anesthetic as its racemate establishes the (—) optical isomer is not only inactive, it apparently interferes with the general anesthetic activity of the (+) isomer when combined therewith as a racemic mixture. Also, the compound of this invention has a better anesthesic activity to side-effects ratio than the racemate.

The present invention possesses general anesthetic properties in primates without markedly depressing respiration. It is a dissociative anesthetic of the type described by Domino et al., in Clinical Pharmacology and Therapeutics, 6:279 (1965). A dissociative anesthetic is one which renders the anesthetized individual incapable of relating to his surroundings and procedures undertaken upon him. This compound is also a useful adjunct to known general anesthetics. In addition to its general anesthetic activity, the compound of this invention provides good muscle relaxation, an important and valuable co-activity for a general anesthetic. The activity of the compound of this invention as a general anesthetic is species-specific, i.e., in dogs and rats, which are two commonly used laboratory test animals, the compound lacks this activity but it is active in primates, e.g., monkeys and man. Thus, it was surprising to discover this activity since it appeared to lack this activity when tested in screening tests employing dogs or rats. Additionally, the compound exhibits anti-convulsant, analgesic, central nervous system depressant, spasmolytic and local anesthetic effects. The analgesic activity of the compound of this invention is unusual in that complete analgesia can be induced, as demonstrated by indifference to noxious and painful stimuli, without inducing a comatose state.

The compound of the invention is water-soluble and is most stable at pH 6 or higher. It is less stable below pH 6. Inasmuch as general anesthetics are commonly administered intravenously, in order to rapidly induce and carefully maintain anesthesia, the preferred embodiment of the compound of this invention is a sterile aqueous solution of a pharmacologically acceptable acid addition salt, preferably a buffered solution, e.g., containing from 0.1 to 5 percent of the compound of this invention. A suitable buffer is sodium succinate. Anti-microbial agents may be added to the solution of the compound of this invention, e.g., when packaged in multiple dose containers. One such agent is benzalkonium chloride, used at a concentration of up to 0.01 percent.

Other routes of administration may be used when the compound is used other than as an I.V. anesthetic. When used orally, it can be compressed into tablets, dissolved in syrups or packaged in capsule form. Other pharmaceutical forms will be apparent to one skilled in the art, e.g., solutions or suspensions for intramuscular administration.

The compound of this invention, viz. α(+)-2-ethyl-2-phenyl - 1,3 - dioxolan-4-yl-piperidine, can exist in free base form and as acid addition salts. The latter can be prepared in the conventional manner by reacting the free base form of the compounds of this invention with an inorganic acid, e.g., hydrochloric, hydrobromic, hydiodic, nitric, sulfuric, and phosphoric acid, or an organic acid, e.g., acetic, hydroxyacetic, lactic, tartaric, glycolic, citric and tannic acid. These salts are convenient forms for the isolation and purification of the compounds of this invention and for the administration of the compounds for the pharmacological purposes set forth herein. In these and other respects the acid addition salt form of the compound of this invention is the equivalent of the free base form. The pharmacologically acceptable salts, e.g., maleate, succinate, hydrochloride, phosphate, sulfate, acetate and tartrate, are used when the compound of this invention is used as an I.V. general anesthetic.

The compound of this invention can be prepared from the alpharacemate of Example 12 of U.S. 3,262,938 in the conventional manner, e.g., by forming an acid addition salt of the free base thereof with an optically active acid and fractionally crystallizing the resulting mixture to separate the optical isomers. Preferably, however, it is prepared according to the process of this invention, which is illustrated by the following flow diagram:

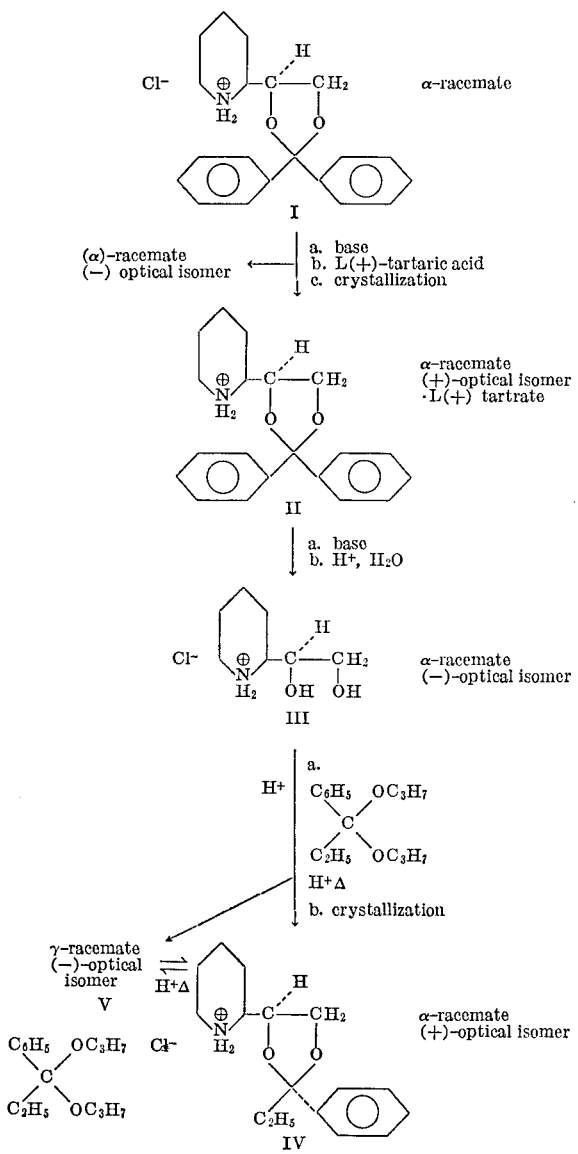

According to the process of this invention, the (—) optical isomer of the alpha-racemate of 2-piperidyl-1,2-ethanediol (III) is prepared by hydrolyzing the (+) optical isomer of the alpha racemate (low melting) of (+) 2,2-diphenyl - 1,3 - dioxolan-4-yl-piperidine L-(+)-tartrate (II) (U.S. 3,262,938, Example 7) or other acid addition salt thereof, e.g., by conventional means, in hot aqueous methanol containing HCl, $H_2SO_4$, p-toluenesulfonic acid or other strong acid to hydrolyze the dioxolane ring. The thus-produced optical isomer of the α-racemate of 2-piperidyl-1,2-ethanediol, which is levorotory (—), can be isolated and purified by conventional means, either in free base or acid addition salt form.

The thus-produced (—) optical isomer of the α-racemate of 2-piperidyl-1,2-ethanediol (III) is then condensed with propiophenone dipropyl acetal in the presence of anhydrous HCl following the procedure disclosed in U.S. 3,262,938 to produce a mixture of the hydrochloride acid addition salt of the dextrorotatory optical isomer of the α-racemate of 2 - (2 - ethyl-2-phenyl-1,3-dioxolan-4-yl)-piperidine of this invention and the hydrochloride addition salt of the levorotatory optical isomer of the γ-racemate of 2-(2-ethyl-2-phenyl-1,3-dioxolan-4-yl)-piperidine. Since these are diastereoisomers, they can be separated by fractional crystallization. Conversion of the separated acid addition salt with NaOH or other base followed by reaction with other acids in the conventional manner enables the production of other acid addition salts thereof.

Surprisingly, the γ(—)-optical isomer can be converted to the α(+)-optical isomer, thus increasing the overall yield of the process by heating the γ(—)isomer under anhydrous conditions in the presence of strong acid, e.g., HCl, $H_2SO_4$, p-toluenesulfonic acid and propiophenone dialkyl acetal.

It will be apparent that the above-described process can be used to produce other optical (+) 2-(2-substituted-1,3-dioxolan-4-yl)-piperidines of α-racemates, of the formula

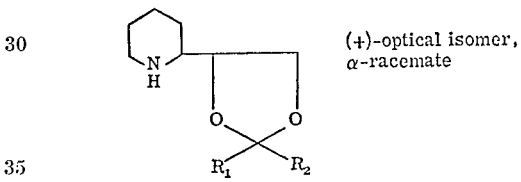

(+)-optical isomer, α-racemate wherein $R_1$ and $R_2$ are different, $R_1$ being alkyl of 1–16 carbon atoms, preferably 1–6, phenyl, benzyl or diphenylmethyl in which the substituents on the benzene ring other than hydrogen are up to two of halo, trifluoromethyl, lower-alkyl, lower-alkoxy, lower-acyloxy, carbo-lower-alkoxy, nitro, or acetamido and $R_2$ being hydrogen or $R_1$, i.e., the (+)-optical isomers of the α-racemates of the compounds of U.S. 3,262,938 by condensation of α(—)-2-piperidyl-1,2-ethanediol with the appropriate aldehyde, unsymmetrical ketone or acetal thereof, with the oxygen bearing carbon atom of the aldehyde, ketone or acetal thereof becoming the 2-carbon atom of the resulting dioxolane ring.

The process of this invention can also be used to produce the corresponding α(—) optical isomers of the unsymmetrical 2 - (2 - substituted - 1,3 - dioxolan - 4 - yl)-piperidines of U.S. 3,262,938 by starting with the corresponding optical isomer of 2-piperidyl-1,2-ethanediol. The process of this invention gives improved yields of the desired optical isomer of the desired racemate of 2 - (2 - substituted - 1,3 - dioxolan - 4 - yl) - piperidine in pure form, substantially free from other optical isomers thereof than by separating the optical isomers of the desired racemate by conventional means.

It was established that the optical isomer of this invention is the (+) optical isomer of the alpha-racemate of Example 12 of U.S. 3,262,938, rather than the (+) optical isomer of the gamma-racemate of Example 13, by following the procedure described in Example I herein using the (—) optical isomer of the alpha racemate of 2 - (2,2 - diphenyl - 1,3 - dioxolan - 4 - yl) - piperidine of Example 10 of U.S. 3,262,938, to produce the (+) optical isomer of the alpha racemate of 2 - piperidyl-1,2-ethanediol of Preparation 14 of U.S. 3,262,938. This compound was then reacted with propiophenone dipropyl acetal and a levorotatory optical isomer of 2-(2-ethyl-2 - phenyl - 1,3 - dioxolan - 4 - yl) - piperidine was isolated. A 50:50 physical mixture of this optical isomer and the (+) optical of this invention when recrystallized produced the alpha-racemate of Example 12 of U.S. 3,262,938.

The foregoing description of the invention, which is not limited in scope thereto, is further illustrated by the following examples. (All temperatures are reported in degrees centigrade.)

EXAMPLE I

α(+)2-(2-ethyl-2-phenyl-1,3-dioxolan-4-yl)-piperidine hydrochloride

A solution of 477 g. of the (+) optical isomer of the alpha-racemate of 2 - (2,2 - diphenyl - 1,3 - dioxolan-4-yl)-piperidine hydrochloride (U.S. 3,262,938, Example 9) in 1500 ml. methanol, 25 ml. water and 20 ml. concentrated hydrochloric acid was refluxed two hours. Most of the methanol was removed by distillation and the concentrate was diluted with 1500 ml. ether. The crystalline product which precipitated was filtered, washed with ether and recrystallized from isopropanol and dried to give 240.9 g. of α(—)2 - piperidyl - 1,2 - ethanediol hydrochloride, melting at about 137–139°; $\alpha_D^{25} = -8.12$.

Analysis.—Calcd. for $C_7H_{15}NO_2 \cdot HCl$ (percent): C, 46.28; H, 8.88; N, 7.71; Cl, 19.52. Found (percent): C, 46.02; H, 8.84; N, 7.87; Cl, 19.46.

A mixture of 1017 g. of α(—)2-piperidyl-1,2-ethanediol hydrochloride and 1592 g. of propiophenone dipropyl acetal (U.S. 3,262,938) in 6 liters of anhydrous isopropanol was brought to reflux and a solution of anhydrous hydrogen chloride in propanol was added to bring the pH between 1 and 2. The solution was refluxed about two hours, allowed to remain at room temperature overnight and the crystalline product which formed was recrystallized twice from isopropanol and dried to give α(+) - 2(2 - ethyl - 2 - phenyl - 1,3 - dioxolan - 4 - yl)-piperidine hydrochloride, melting at about 221.5–222.0°; $\alpha_D^{25} = +16.63$.

Analysis.—Calcd. for $C_{16}H_{23}NO_2 \cdot HCl$ (percent): C, 64.52; H, 8.12; N, 4.70; Cl, 11.90. Found (percent): C, 64.37; H, 7.93; N, 4.79; Cl, 11.83.

The solvent was removed from the mother liquors and the residue was heated for several hours in refluxing propanol containing anhydrous hydrogen chloride and additional propiophenone dipropyl acetal. Isolation of crystalline product in the manner described above yielded an additional amount of the α(+)-isomer.

EXAMPLE II

α(+)2-(2-ethyl-2-phenyl-1,3-dioxolan-4-yl)-piperidine maleate

An aqueous solution of the hydrochloride salt of Example I was rendered basic with dilute sodium hydroxide solution and the free base was extracted with ether. The ether solution was dried over magnesium sulfate, filtered, and the ether was removed. A molar equivalent of maleic acid in ethanol was added to the free base and the solution was diluted with dry ether. The crystalline product was recrystallized from isopropanol to give α(+)2(2-ethyl - 2 - phenyl - 1,3 - dioxolan - 4 - yl) - piperidine maleate, melting at about 127.5–128.5°.

Analysis.—Calcd. for $C_{16}H_{23}NO_2 \cdot C_4H_4O_4$ (percent): C, 63.65; H, 7.21; N, 3.71. Found (percent): C, 63.66; H, 7.10; N, 3.57.

EXAMPLE III

Use of (+) optical isomer of α-racemate of 2 - (2-ethyl - 2 - phenyl - 1,3 - dioxolan - 4 - yl) - piperidine as intravenous anesthetic The surgical opening of the abdomen or laparotomy was accomplished in African Green Monkeys (cercopithecus aethiops) using the minimal effective dose of the compound. The surgical procedure was an incision of about 4 to 5 centimeters lateral to either side of the midline in the lower left quadrant of the abdomen. Each muscle layer was separated and the peritoneum opened. Vicera under the liver was probed before the wound was closed layer-by-layer. The surgery was completed in ten to 15 minutes. The results of the experiments are set forth below:

| Monkey weight and sex | Dose (mg./kg.) | Anesthesia (minutes) | |
|---|---|---|---|
| | | Onset | Duration |
| 3.35 kg. male | 5 | 2 | 30 |
| 2.4 kg. male | 5 | 2 | 64 |
| 2.45 kg. female | 5 | 1 | 67 |
| 2.45 kg. female | 2.5 | 0.5 | 27 |
| 2.5 kg. female | 2.5 | 0.5 | 28 |
| 3.4 kg. female | 2.5 | 0.4 | 32 |

The dose was given intravenously as a one percent aqueous solution. The onset is the time in minutes at which the monkey was released unrestrained. Duration is the time in minutes after onset of anesthesia when the monkey began to lift his head or attempted to rise from the table. Abdominal muscles were easily manipulated during the procedure due to the muscle relaxant properties of the compound.

Similar results are observed when the compound of this invention is used as a general anesthetic for surgical purposes in other primates, e.g., man, apes, chimpanzees, etc.

What is claimed is:

1. A method for the production of the (+)-optical isomer of the alpha-racemate of a 2-(1,3-dioxolan-4-yl)-piperidine unsymmetrically substituted at the 2-position of the dioxolane ring, substantially free from isomers thereof, which comprises
   (a) hydrolyzing with acid the dextrorotatory optical isomer of the alpha racemate of 2-(2,2-diphenyl-1,3-dioxolan-4-yl)-piperidine, substantially free from isomers thereof;
   (b) recovering the levorotatory optical isomer of 2-piperidyl-1,2-ethanediol thus-produced;
   (c) condensing the thus-produced levorotatory optical isomer with an aldehyde, an unsymmetrical ketone or acetal thereof to produce a diasteromeric mixture of the (+)-optical isomer of the α-racemate and the (—)-optical isomer of the γ-racemate of the thus-produced 2-(1,3-dioxolan-4-yl)-piperidine unsymmetrically substituted at the 2-position of the dioxolane ring; and
   (d) separating the (+)-optical isomer from the (—)-optical isomer by crystallization.

2. A process according to claim 1 wherein the separated (—)-optical isomer of the γ-racemate is converted to the (+)-optical isomer of the α-racemate by heating under anhydrous conditions in the presence of a strong acid.

3. The method of claim 1 wherein in the step (c) the (—)-optical isomer of 2-piperidyl-1,2-ethanediol is condensed with propiophenone dialkyl acetal.

References Cited

UNITED STATES PATENTS

| 1,915,334 | 6/1933 | Salzberg et al. | 260—243 |
| 2,075,359 | 3/1937 | Salzberg et al. | 424—250 |
| 3,262,938 | 7/1966 | Hardie et al. | 260—294.7 D |

HENRY R. JILES, Primary Examiner

S. D. WINTERS, Assistant Examiner

U.S. Cl. X.R.

424—267; 260—293.9